I. AVERY.
Wheel-Cultivator.
No. 56,344. Patented July 17, 1866.
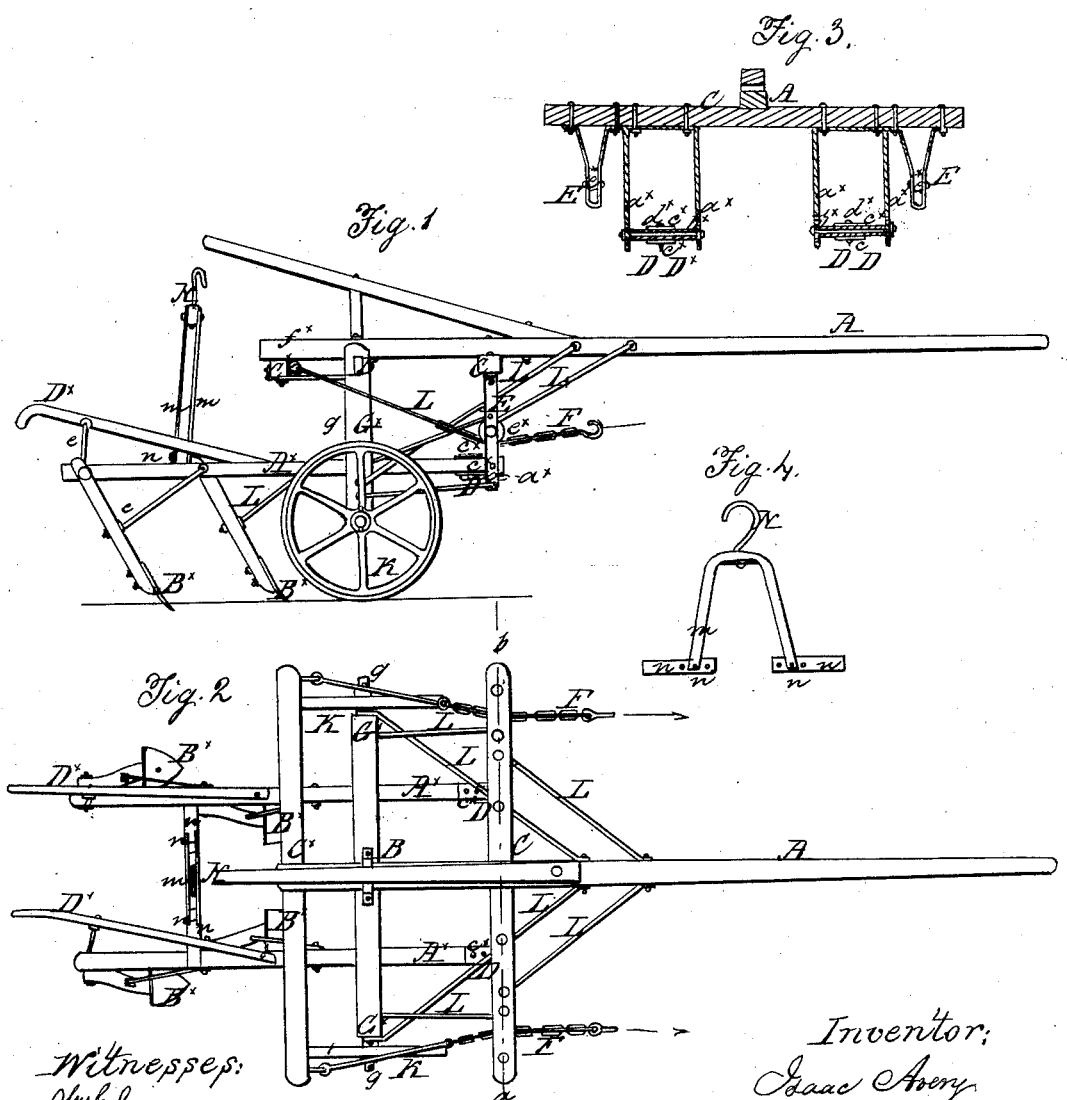

ns to pass through them and into the universal joint bars.

UNITED STATES PATENT OFFICE.

ISAAC AVERY, OF OTTAWA, ILLINOIS.

IMPROVEMENT IN CULTIVATORS.

Specification forming part of Letters Patent No. 56,344, dated July 17, 1866.

*To all whom it may concern:*

Be it known that I, ISAAC AVERY, of Ottawa, in the county of La Salle and State of Illinois, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a side view of my invention; Fig. 2, a plan or top view of the same; Fig. 3, a transverse vertical section of the same taken in the line $a\ b$, Fig. 2; Fig. 4, a detached view of a part pertaining to the same.

Similar letters of reference indicate corresponding parts.

This invention relates to a new and improved cultivator of that class designed for plowing and cultivating those crops which are grown in hills or drills, such as corn, potatoes, &c.

The invention consists in an improved draft attachment, as hereinafter fully shown and described, whereby the device may be operated or drawn along by a moderate application of power, the plows manipulated or moved either vertically or laterally, and the whole device placed under the complete control of the operator or driver.

A represents the draft-pole of the device, which is secured at its rear part to two cross-bars, C and B, the front one, C, having four pendants, $a^\times$, attached to its under side to support universal joints D D′, by which two plow-beams, A$^\times$ A$^\times$, are connected to C.

These universal joints are composed of bars $b^\times$, having pivots or journals in their ends, which are fitted and work in the pendants $a^\times$, and of plates $c^\times$, which are secured to the upper and lower surfaces of the plow-beams at their front ends, and are connected by pivot-bolts $d^\times$ to the bars $b^\times$.

By this mode of connection it will be seen that the plow-beams may be raised and lowered and also moved vertically, and the plows B$^\times$, which are attached to said beams by the usual standards, may consequently be moved in any desired direction, either laterally, to conform to the sinuosities of the rows of plants, or vertically, to pass over any obstructions which may be in their path.

The plow-beams are provided with the usual handles D$^\times$.

To the cross-bar C there are also attached two pendants, E E, one near each end, said pendants having pulleys $e^\times$ at their lower ends, under which the trace-chains F pass, said chains being connected to each end of a doubletree or evener, C$^\times$, which is secured at its center by a pivot-bolt, $f^\times$, to the rear end of the draft-pole.

The cross-bar B has a wooden pendant, G$^\times$, at each end of it, said pendants having arms $g$ at their lower ends, on which the wheels K are placed.

By this arrangement the draft of the machine is rendered comparatively light, the pull on the traces F being oblique and from quite points, owing to the low position of the pulleys $e^\times$. Hence the wheels K will frequently be lifted off from the ground.

L represents wrought-iron braces to keep all the parts of the machine in proper position, and $m$ is a curved brace composed of two wrought-iron bars bent in U form, with a wooden bar secured between them, having a hook, N, fitted in it.

The lower ends of the curved bars are connected to bars $n\ n$, which are secured by pivots to the plow-beams A$^\times$.

By this arrangement it will be seen that the plow-beams are connected together, and at the same time admit of being moved separately, or one independent of the other, in a vertical direction.

I would remark that the plow-beams may be adjusted nearer together or farther apart, as may be desired, by having a series of holes made in the bars $n$, through any of which the pivots which secure them to the plow-beams may pass, and the pivots or bolts $d^\times$ of the plates $c^\times$ of the universal joints may also pass through any of a series of holes in the bars $b^\times$.

The depth of the penetration of the plows may be regulated by inserting the bars $b^\times$ of the universal joints higher or lower between the pendants $a^\times$, the latter being provided with a series of holes to admit of this.

Having thus described my invention, I claim as new and desire to secure by Letters Patent—

1. The attaching of the plow-beams $A^\times$ to pendants $a^\times$ of the cross-bar C by means of universal joints D D', substantially as and for the purpose specified.

2. The combination of the plow-beams $A^\times$, universal joints D D', double-tree or evener C, trace-chains F, and pulleys $e^\times$, all arranged to operate in the manner substantially as and for the purpose herein set forth.

ISAAC AVERY.

Witnesses:
AUSTIN ADAIR,
EALON WEAVER.